May 14, 1946.   E. C. KLEPP   2,400,308
ELECTRIC RATIOMETER
Filed June 2, 1943

INVENTOR
Edwin C. Klepp
By Watson, Cole, Grindle & Watson
ATTYS

Patented May 14, 1946

2,400,308

UNITED STATES PATENT OFFICE 2,400,308

ELECTRIC RATIOMETER

Edwin Claude Klepp, Cricklewood, London, England, assignor to S. Smith & Sons (England) Limited, a British company Application June 2, 1943, Serial No. 489,419
In Great Britain March 25, 1942

5 Claims. (Cl. 171—95)

This invention relates to moving coil electric instruments of the kind comprising two coils together rotatable in a magnetic field and adapted to be connected in circuit with two impedances respectively and with an electric source, the coils being wound to produce opposing torques so that an indication of the relationship of the impedances is obtained by the amount of rotation of the coils due to the resultant torque.

In known instruments of this kind parts of each coil are always in the field and therefore subjected to a force while the coil is carrying current, such parts will be referred to as "the effective lengths" of the coil. Thus, in the commonest form of such instrument a cylindrical core is arranged in the gap between a pair of curved pole faces of a magnet having the same centre of curvature as the core. The core thus forms another pair of pole faces on the inner sides of two arcuate air gaps. The coils embrace the core with their axes of rotation coincident with that of the core so that the opposite sides of each coil pass respectively through the arcuate air gaps. The parts of these opposite sides which are within the air gap are "the effective lengths" of the coil. As the air gaps are of constant width (measured radially) and constant depth (measured axially) a coil carrying a specific current is always subjected to the same torque no matter what position the effective parts occupy in the gap, provided of course they are not adjacent the ends of the gaps. In other words, the intensity of the field and the length of the effective parts remains constant and the direction of the field is always radial. Heretofore, the coils were usually biassed by means of a restoring spring so that as the resultant torque for given currents in the coil is constant the deflection of the coils was a true measure of the difference of the currents in the two coils. The deflection, however, will not be a true measure of the difference between the two impedances unless the voltage of the electric source remains constant. If the voltage varies the current difference and therefore the deflection will vary without any change in the relationship between the two impedances. The object of this invention is to overcome this difficulty and so render the instrument independent of voltage variations.

One method of achieving this end has been described in my United States Patent No. 2,357,524, granted September 5, 1944. According to that patent the intensity of the magnetic field instead of being constant is made to vary along the path traversed by the effective parts of the coil, which are arranged side by side, and thus always lie in different field densities. A restoring spring can therefore be dispensed with because the coils will take up a position in which the electro-magnetic torque applied to one coil will balance that applied to the other coil and hence a position which is substantially independent of the voltage of the electric source and which, due to the absence of a restoring spring, is determined solely by the ratio of the impedances. As there described the magnetic field is made to vary by varying the width of the air gaps by suitable shaping or spacing of the pole faces.

According to this invention a moving coil electric instrument of the kind referred to above is characterised in that means are provided for subjecting different effective lengths of the coils to a magnetic field as the coils move through said field. As in the construction of my United States patent aforesaid, this enables the elimination of anything but a weak restoring spring.

Those parts of the instrument which produce said field may be so constructed that the boundary of the field varies along the path of the coils and influences different effective lengths of the coils during their movement therethrough. For example, the depth of the air gap between those parts of the instrument which form the field in a direction transverse to the lines of force and to the direction of movement of the coil is arranged to vary along the path of movement of the coils.

As in the previous construction, the coils are arranged to move in a gap formed between a core and two magnet poles since the faces of the core receive flux from the magnet poles they themselves may be considered as magnet poles. According to the present invention the different effective lengths of the coils are arranged to be subjected to the magnet field by appropriately shaping the core around which the coils move. Preferably the core is so shaped that the radial width of the gap between the core and pole pieces is constant along the path of travel of the coils. Since the force applied to a coil is determined, not only by the intensity of the field in which it is situated, but also by its effective length, the coils will, as before, take up a position in which the electromagnetic force applied to one coil will balance that applied to the other coil, even if the field intensity is not varied along the path of the coil. This position will accordingly be substantially independent of the voltage of the source.

The following is a description of two alternative embodiments of the invention as applied to a moving coil ratiometer, reference being made to the accompanying drawing, in which.

Figure 4:
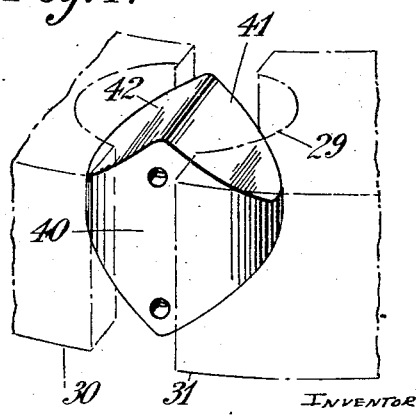

Figure 4 another type of core, and

Figure 5:
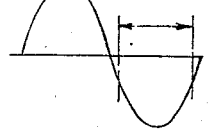
Figure 6:
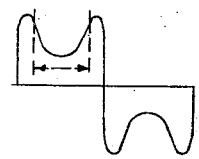
Figure 3:
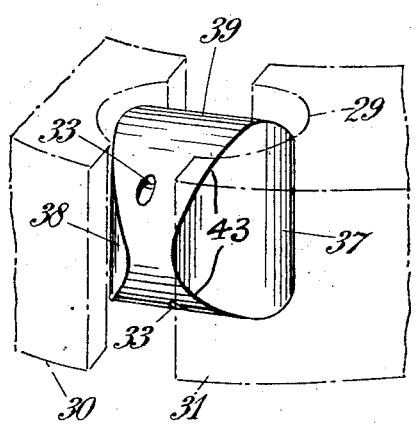
Figure 3 shows one form of core.

Figures 5 and 6 are graphs showing respectively the flux distribution around the cores of Figures 3 and 4.

Figure 2:
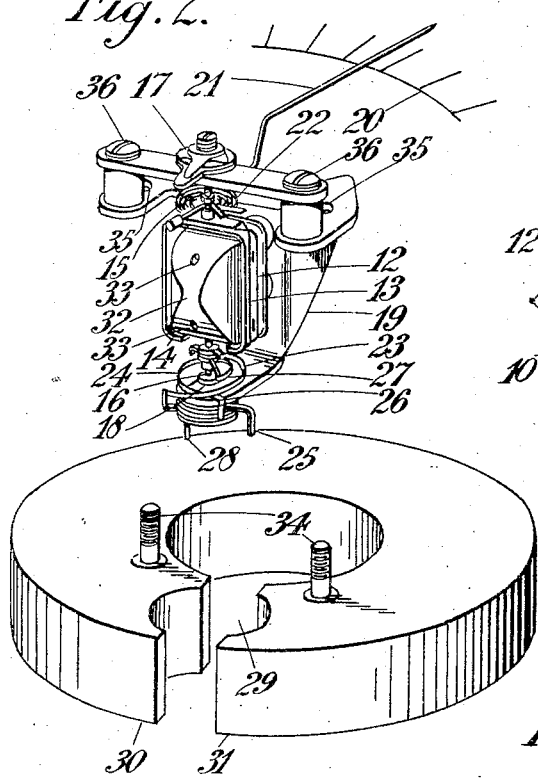
Figure 2 is a perspective view of the instrument showing the moving coils and core displaced from the magnet.
Figure 1:
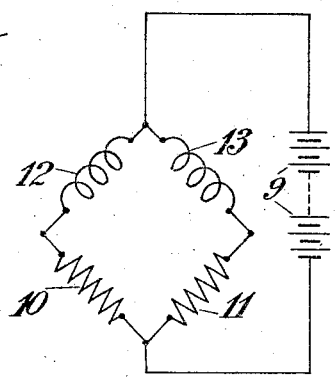
Figure 1 shows the electric circuit arrangement.

The electric circuit arrangement shown in Figure 1 is similar to that described in my United States patent aforesaid. The impedances which it is desired to measure are shown at 10 and 11, which impedances are connected at one end to the ends of two coils 12 and 13 respectively. The other ends of the impedances and the other ends of the coils are connected to a source of supply 9. It will thus be seen that when the impedances 10 and 11 are of the same value, the same current will be flowing through the two coils 12 and 13 irrespective of variation of potential in the system. Referring to Figure 2, the two coils 12 and 13 are wound upon a rectangular former 14 in the manner illustrated in the above noted patent which is provided with pivots 15 and 16 at opposite ends thereof, mounted in suitable jewel bearings 18 only the lower of which is shown. The bearings are carried in a framework 19 which may also carry a scale 20. The pivot 15 has secured to it a pointer 21 arranged to traverse the scale 20. A light spiral spring 22 has its inner end secured to a tag carried by the former 14 and connected to the junction point of the two coils 12 and 13 while its outer end is anchored to the framework 19 and is provided with an input tag. The spring thus serves the dual purpose of ensuring that the pointer returns to a zero position and as a current ligament feeding the two coils. Those ends of the coils 12 and 13 which are to be connected to the impedances 10 and 11 are connected to flexible current ligaments 23 and 24 which in their turn are connected into lead-in tags 25 and 26. The coils 12 and 13 and former 14 are arranged for location in a cylindrical gap 29 formed between the pole pieces 30 and 31 of a circular horseshoe magnet, and encircle a soft iron core 32. In assembling the mechanism the core is inserted in the former and placed in the gap 29 where it is held by bolts which pass through the holes 33 and engage the framework 19. The pole pieces are provided with securing bolts 34 which engage holes 35 on said framework.

As already indicated, the gap between the pole pieces is cylindrical and the required variation in depth of the field is provided by suitably shaping the pole faces. Two different forms of core are shown in Figures 3 and 4. In Figure 3, the core has two part-cylindrical faces 37, 38 of the same diameter, and the axis of which is arranged to be coaxial with the pivots 15 and 16. These cylindrical faces are intersected by another cylindrical face 39 having its axis at right-angles to the first said axis, so that the axial depth of the face 37 varies around its circumference. The core is so located in the gap that the depth of the field in the direction of the first said axis is greatest midway across each pole face and diminishes on either side of the mid position. The side stretches of the two coils 12 and 13 are spaced apart and thus lie in parts of the field having different axial widths. The end stretches above and below the core cross one another so that when there is a difference of torque produced in the two coils owing to the different currents flowing through them and to their relative positions in the field, then it can be ensured that the resultant torque will be the same on both sides of the former. Thus, assuming the impedances 10 and 11 differ from one another the two coils move into a position in which the combined effect of the current in one coil and the axial length of the field in which it is disposed balances the effect of the different current in the other coil and the different axial length of the field in which it is disposed. The effect of the spiral spring 22 is negligible.

In the arrangement shown in Figure 4, the core is completely encircled by a cylindrical face 40 and the axial depth of the face varies around its circumference by reason of the fact that the top and bottom of the core are both provided with two flat faces 41 and 42 inclined to one another and to a plane containing the axis of rotation of the two coils. As will be seen from Figure 6 there will be two peak positions for maximum flux between each magnet pole piece and the core.

The flux distribution provided by the shapes of core shown in Figures 3 and 4 are illustrated in Figures 5 and 6 respectively in which the horizontal co-ordinates represent the angular position around the core and the vertical co-ordinates represent the strength of the flux. The peak values of the flux are opposite those located where the depth of the core is a maximum.

The distribution shown in Figure 5 is preferred to that shown in Figure 6. Dimension lines shown in the two drawings indicate the useful length of the flux distribution curve. It will be seen that this length is greater in the case of Figure 5 than Figure 6. For the instrument to have a regular scale shape, i. e., the scale marking to be at regular intervals on the arc for linear changes of the indicated value, it is necessary for the change of slope of the curve to be constant. In the case of a core-piece producing the curve shown in Figure 5 the curve becomes very steep adjacent to the intersection with the zero line and the scale markings will be close. It will be appreciated that the shape of the curve will depend inter alia on the shape of the edges provided by the intersection of the two cylindrical surfaces. The shape of the curve may be modified by chamfering certain parts of these edges. For example, a more uniform scale will be obtained if the upper and lower edges are chamfered at the locations marked 43. The curve shown in Figure 6 changes its sign outside the boundaries of the useful length thereby making the performance of the instrument unstable. Should the moving parts of the instrument travel beyond these boundaries, the coil would immediately travel over the peak of the curve and would not return on to the scale even though the current ratio were adjusted to represent a point in the middle of the scale arc.

In either of the arrangements referred to above, the upper and lower edges of the pole-pieces may be shaped to correspond with those of the core. In the arrangement referred to above, the radial width of the gap between the core and pole-pieces is constant along the path of travel of the coils; it may, however, be made to vary by suitably shaping the pole-faces.

Thus, both the intensity of the field and the length of the coils influenced thereby will vary along the path of movement of the coils.

I claim:
1. A moving coil electric instrument comprising two magnet poles spaced apart, a core disposed between the poles so as to provide gaps between it and the poles, two coils arranged side by side and encircling said core with their side stretches in said gaps, a rotatable mounting for said coils arranged to permit rotation of said coils about an axis substantially parallel to the plane of the coils, which coils are wound so as to transmit opposing torques to said mounting, which core is provided with a cylindrical outer surface having its axis coincident with the axis of rotation of the coils, which surface is intersected by another cylndrical surface having its axis transverse thereto so as to separate the first said cylindrical surfaces into two parts.

2. A moving coil electric instrument comprising two magnet poles spaced apart, a core disposed between the poles so as to provide gaps between it and the poles, two coils arranged side by side and encircling said core, with their side stretches in said gaps, a rotatable mounting for said coils arranged to permit rotation of said coils about an axis substantially parallel to the plane of the coils, which coils are wound so as to transmit opposing torques to said mounting, which core is provided with a cylindrical surface, the axis of which is coincident with the axis of rotation of the coils, and is provided with two end faces each formed by two flat faces inclined to one another and to a plane containing said axis of rotation of the mounting.

3. A moving coil electric instrument comprising two magnet poles spaced apart, a core disposed between the poles so as to provide gaps between it and the poles, two coils arranged side by side and encircling said core, with their side stretches in said gaps, a rotatable mounting for said coils arranged to permit rotation of said coils about an axis substantially parallel to the plane of the coils, which coils are wound so as to transmit opposing torques to said mounting, which core is so shaped as to provide a cylindrical outer surface having its axis coincident with the axis of rotation of the coils, which surface is intersected by another cylindrical surface having its axis transverse thereto so as to separate the first said cylindrical surfaces into two parts, the edges provided by the intersection of the two said cylindrical surfaces being chamfered.

4. A moving coil electrical instrument comprising two magnet poles spaced apart, a core disposed between the poles so as to provide gaps between it and the poles, two coils arranged side by side and encircling said core with their side stretches in said gaps, a rotatable mounting for said coils arranged to permit rotation of said coils about an axis substantially parallel to the plane of the coils, which coils are wound so as to transmit opposing torques to said mounting, which core is provided with a cylindrical outer surface having its axis coincident with the axis of rotation of the coils, and is provided with two end faces each formed by two flat faces inclined to one another and to a plane containing the axis of rotation of the mounting, the edges provided by the intersection of the flat surfaces with the cylindrical surfaces being chamfered.

5. A moving coil electric instrument comprising two magnet poles spaced apart, a core disposed between the poles so as to provide gaps between it and the poles, two coils arranged side by side and encircling said core with their side stretches in said gaps, a rotatable mounting for said coils arranged to permit rotation of said coils about an axis substantially parallel to the plane of the coils, which coils are wound so as to transmit opposing torques to said mounting, which core is provided with a cylindrical outer surface having its axis coincident with the axis of rotation of the coils, and provided with a second surface so intersecting said cylindrical surface that the axial depth of the latter varies around its circumference, whereby varying lengths of the side stretches of the coils cut the magnetic field in moving through said gap.

EDWIN CLAUDE KLEPP.